(12) United States Patent
Weaver et al.

(10) Patent No.: US 7,645,725 B2
(45) Date of Patent: Jan. 12, 2010

(54) SUBTERRANEAN TREATMENT FLUIDS WITH IMPROVED FLUID LOSS CONTROL

(75) Inventors: Jimmie D. Weaver, Duncan, OK (US); Billy F. Slabaugh, Duncan, OK (US); Harold G. Walters, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 270 days.

(21) Appl. No.: 11/404,352

(22) Filed: Apr. 14, 2006

(65) Prior Publication Data

US 2007/0244014 A1    Oct. 18, 2007

(51) Int. Cl.
*C09K 8/72* (2006.01)

(52) U.S. Cl. .................. 507/215; 507/216; 507/222; 507/225; 507/240; 524/27; 524/36; 524/43; 524/45

(58) Field of Classification Search .............. 507/215, 507/219
See application file for complete search history.

(56) References Cited

U.S. PATENT DOCUMENTS

| 4,982,793 | A | 1/1991 | Holtmyer et al. ......... 166/305.1 |
| 5,067,565 | A | 11/1991 | Holtmyer et al. ......... 166/305.1 |
| 5,122,549 | A | 6/1992 | Holtmyer et al. ............ 523/130 |
| 5,955,540 | A | 9/1999 | Dion et al. .................... 525/71 |
| 6,072,014 | A | 6/2000 | Wilson, Jr. .................. 526/352 |
| 2006/0047027 | A1 * | 3/2006 | Brannon et al. ............... 524/27 |
| 2006/0205603 | A1 * | 9/2006 | Colle et al. .................. 507/90 |

OTHER PUBLICATIONS

Halliburton, "Enhancement.", 2003.

* cited by examiner

*Primary Examiner*—Timothy J. Kugel
*Assistant Examiner*—Atnaf Admasu
(74) *Attorney, Agent, or Firm*—Robert A. Kent; Baker Botts LLP

(57) ABSTRACT

Fluids useful as subterranean treatment fluids, and more particularly, polymeric fluid loss additives, subterranean treatment fluids with improved fluid loss control, and their associated methods of use, are provided. In one embodiment, the methods comprise: providing a treatment fluid that comprises a base fluid, and a polymeric fluid loss control additive that comprises at least a first plurality of polymer molecules having a first average molecular weight, and a second plurality of polymer molecules having a second average molecular weight, wherein the first average molecular weight is different from the second average molecular weight; and introducing the treatment fluid into a subterranean formation.

19 Claims, 2 Drawing Sheets

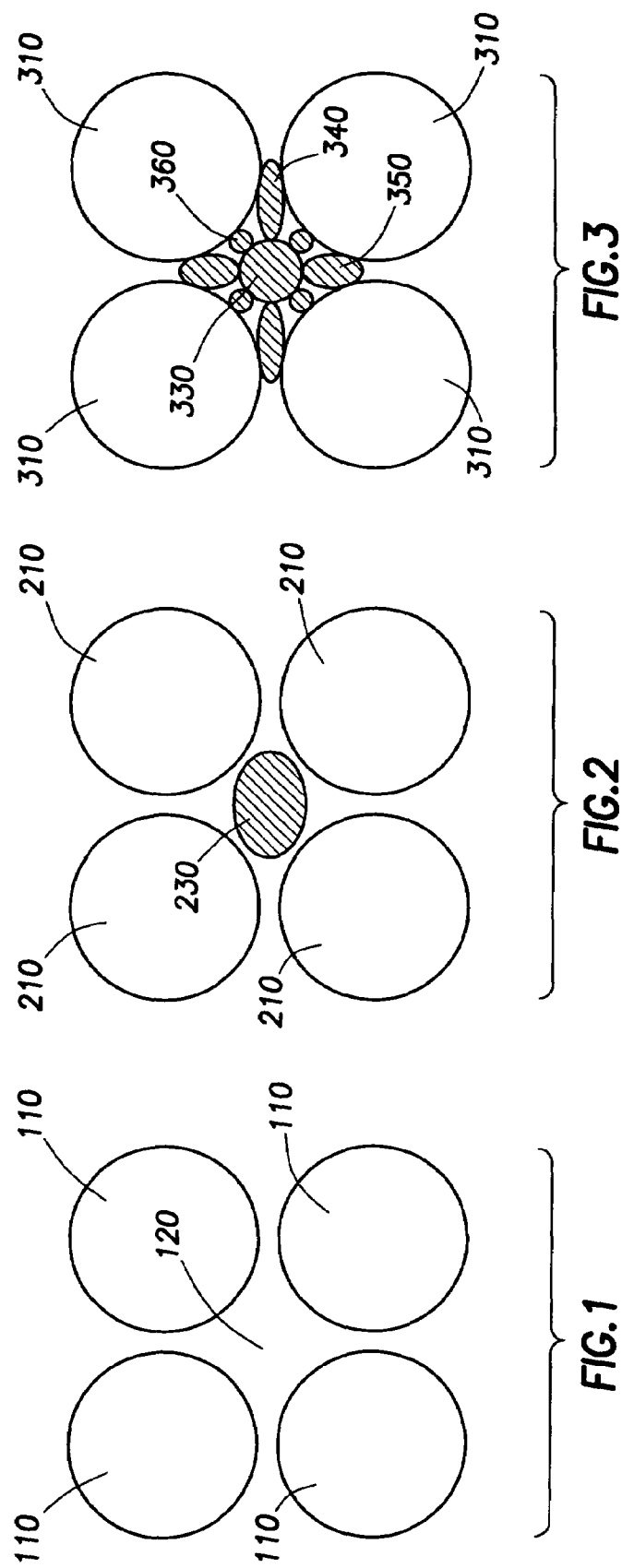

SUBTERRANEAN TREATMENT FLUIDS WITH IMPROVED FLUID LOSS CONTROL

BACKGROUND

The present invention relates to fluids useful as subterranean treatment fluids, and more particularly, to polymeric fluid loss additives, subterranean treatment fluids having improved fluid loss control, and their associated methods of use.

Providing effective fluid loss control for subterranean treatment fluids is highly desirable. "Fluid loss," as that term is used herein, refers to the undesirable migration or loss of fluids (such as the fluid portion of a drilling mud or cement slurry) into a subterranean formation and/or a proppant pack. The term "proppant pack," as used herein, refers to a collection of a mass of proppant particulates within a fracture or open space in a subterranean formation. These "treatment fluids" may comprise any fluids used in a subterranean application. As used herein, the term "treatment" does not imply any particular action by the fluid or any component thereof. Treatment fluids may be used in any number of subterranean operations, including drilling operations, fracturing operations, acidizing operations, gravel-packing operations, acidizing operations, well bore clean-out operations, and the like. Fluid loss may be problematic in any number of these operations. In fracturing treatments, for example, fluid loss into the formation may result in a reduction in fluid efficiency, such that the fracturing fluid cannot propagate the fracture as desired.

Fluid loss control materials are additives that lower the volume of a filtrate that passes through a filter medium. Particulate materials may be used as a fluid loss control materials in subterranean treatment fluids to fill the pore spaces in a formation matrix and/or proppant pack and/or to contact the surface of a formation face and/or proppant pack, thereby forming a filter cake that blocks the pore spaces in the formation or proppant pack, and prevents fluid loss therein. However, the use of particulate fluid loss control materials may be problematic. For instance, the sizes of the particulates may not be optimized for the pore spaces in a particular formation matrix and/or proppant pack and, as a result, may increase the risk of invasion of the particulate material into the interior of the formation matrix, which may greatly increase the difficulty of removal by subsequent remedial treatments. Additionally, once fluid loss control is no longer required, for example, after completing a treatment, remedial treatments may be required to remove the previously-placed fluid loss control materials, inter alia, so that a well may be placed into production. However, particulates that have become lodged in pore spaces and/or pore throats in the formation matrix and/or proppant pack may be difficult and/or costly to remove. Moreover, particulate fluid loss control materials may not be effective in low-permeability formations (e.g., formations with a permeability below about 1 milidarcy ("md")) since the leakoff rate in those formations is not high enough to pull the particulates into the pore spaces or into contact with the surface of the formation face and/or proppant pack so as to block or seal off the pore spaces therein.

Gelled fluids and fluid loss control "pills" comprising high-molecular weight polymers and/or crosslinked polymers have also been used to improve fluid loss control. "Crosslinked polymers" are polymers wherein two or more of the polymer molecules have become "crosslinked" by interaction with a "crosslinking agent," such as a metal ion or a borate ion. When included in a treatment fluid, these polymeric materials may viscosify that fluid, thereby reducing the leakoff rate of the fluid into the formation and/or proppant pack. Polymer molecules also may reduce fluid loss by filling the pore spaces of the formation matrix and/or proppant pack, thereby preventing the flow of fluid through those pore spaces.

However, the use of polymeric fluid loss control additives also may present a variety of problems. First, in treatments using crosslinked polymers, it may be necessary to maintain certain conditions (for example, specific pH levels) in order for the crosslinking agent to crosslink the polymer molecules, which may require the use of additional additives that add cost and complexity to the operation, or in some cases may be incompatible with other aspects of the treatment fluid or the operation. The polymer molecules also may "over-crosslink" in the presence of high concentrations of crosslinking agent, yielding a treatment fluid that is over-viscosified, difficult to break, exhibits syneresis (i.e., separation of liquid in a gel), or has other undesirable rheological properties.

Also, as in the case of particulate fluid loss control materials, the molecules of polymeric fluid loss control additives may not be sized correctly (e.g., have a desired molecular weight and/or hydrodynamic volume) to effectively fill the pore spaces within a formation matrix and/or proppant pack. The "modality" of a polymeric material is defined herein to refer to the number of ranges that the molecular weights of the molecules of the polymeric material fall within. For example, a "monomodal" polymeric material refers to a polymeric material that comprises molecules that have molecular weight distributions within a single range, whereas a "multimodal" polymeric material refers to a polymeric material that comprises at least two pluralities of polymer molecules having different average molecular weights. The "dispersity" of a polymeric material is defined herein to refer the breadth of the range of molecular weights of the molecules in a given sample of a polymer. The dispersity of a polymeric material may be defined numerically as the breadth of the molecular weight distribution for a sample of a polymer divided by the average molecular weight. Polymeric materials found in nature are generally monomodal and/or have very low dispersities of molecular weight (i.e., they are relatively "monodispersed," or "narrowly dispersed," which refers to a polymeric material whose molecules all have a molecular weight that falls within a narrow range). Polymeric materials with relatively low dispersities of molecular weight, like the particulate fluid loss materials discussed above, may not be able to fill the pore spaces sufficiently to prevent fluid loss into the formation. For example, if the polymer molecules are all relatively large, they may be unable to fit within certain pore throats in the formation to plug the pore spaces therein. However, if the polymer molecules used as a fluid loss control additive are all relatively small (e.g., so as to to fill smaller pore spaces in low permeability formations), this may, among other things, limit the particulate transport capability of the fluid (e.g., limiting the size and amount of proppant particulates that the fluid can carry downhole).

SUMMARY

The present invention relates to fluids useful as subterranean treatment fluids, and more particularly, to polymeric fluid loss additives, subterranean treatment fluids having improved fluid loss control, and their associated methods of use.

In one embodiment, the present invention provides a method comprising: providing a treatment fluid that comprises a base fluid, and a polymeric fluid loss control additive that comprises at least a first plurality of polymer molecules having a first average molecular weight, and a second plurality of polymer molecules having a second average molecular weight, wherein the first average molecular weight is different from the second average molecular weight; and introducing the treatment fluid into a subterranean formation.

In another embodiment, the present invention provides a method of preparing a treatment fluid comprising: providing a base fluid; providing a first plurality of polymer molecules having a first average molecular weight; providing a second plurality of polymer molecules having a second average molecular weight different from the average molecular weight of the first plurality of polymer molecules; and combining the first and second pluralities of polymer molecules with the base fluid.

In another embodiment, the present invention provides a method of preparing a polymeric fluid loss additive comprising: providing a first plurality of polymer molecules having a first average molecular weight; providing a second plurality of polymer molecules having a second average molecular weight different from the average molecular weight of the first plurality of polymer molecules; and combining the first and second pluralities of polymer molecules.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIG. 1 illustrates a cross-sectional view of an illustration of a schematic of a formation matrix or proppant pack.

FIG. 2 illustrates a cross-sectional view of the formation matrix illustrated in FIG. 1 that has been treated with a substantially monodispersed fluid loss control additive.

FIG. 3 illustrates a cross-sectional view of the formation matrix illustrated in FIG. 1 that has been treated with a fluid loss control additive according to one embodiment of the present invention.

DESCRIPTION OF PREFERRED EMBODIMENTS

Figure 6:
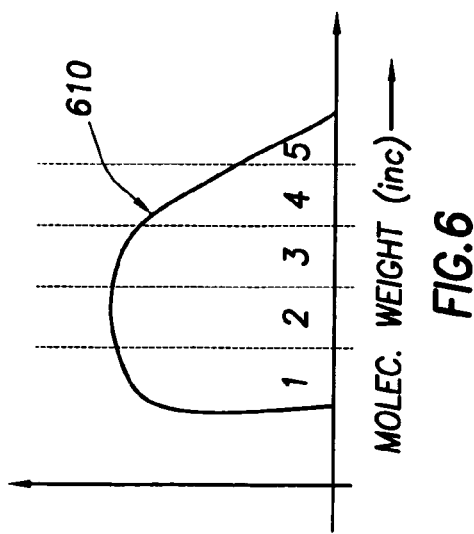
FIG. 6 illustrates some data regarding the dispersity of another polymeric fluid loss control additive of the present invention.

The present invention relates to fluids useful as subterranean treatment fluids, and more particularly, to polymeric fluid loss additives, subterranean treatment fluids having improved fluid loss control, and their associated methods of use.

The treatment fluids and polymeric fluid loss control additives of the present invention generally comprise a multimodal polymeric material that comprises at least a first plurality of polymer molecules having a first average molecular weight, and a second plurality of polymer molecules having a second average molecular weight, wherein the first average molecular weight is different from the second average molecular weight. A combination of two or more pluralities of polymer molecules having different average molecular weights is referred to herein as a "multimodal" polymeric material. In some embodiments, the polymeric material may have a dispersity that is greater than the dispersity of the polymeric material with the same chemical formula as it exists in nature, which is referred to herein as an "increased-dispersity polymeric material." The treatment fluids of the present invention may exhibit, among other things, improved fluid loss control properties without the need for particulate materials and/or large amounts of a crosslinking agent. The pluralities of polymer molecules in the treatment fluids of the present invention also may be less likely to become "over-crosslinked," which refers to a fluid comprising polymer molecules that have become crosslinked to an extent that gives rise to undesirable Theological properties (e.g., becomes difficult to break and/or exhibits syneresis). Moreover, other rheological properties (e.g., particulate transport ability) of the treatment fluids of the present invention may be controlled or enhanced by including certain types of polymeric materials therein, while still maintaining a desired degree of fluid loss control.

The treatment fluids and polymeric fluid loss control additives of the present invention, in addition to the first and second pluralities of polymer molecules may comprise additional pluralities of polymer molecules having their own average molecular weights. For example, the treatment fluid or additive may comprise a third plurality of polymer molecules having a third average molecular weight that is different from the first and second average molecular weights. The treatment fluids and additives of the present invention may comprise any number of pluralities of polymer molecules (e.g., fourth, fifth, and sixth pluralities of polymer molecules, etc.) having their own molecular weights (e.g., fourth, fifth, and sixth molecular weights, etc.). A person of skill in the art, with the benefit of this disclosure, will be able to determine the number of pluralities of polymer molecules that is appropriate for a particular application of the present invention.

By way of example and not limitation, one possible mechanism of the reduction of fluid loss that may be accomplished in certain embodiments of the present invention is illustrated in FIGS. 1, 2, and 3. FIG. 1 illustrates a cross-sectional view of a schematic illustration representing a formation matrix or proppant pack in which formation particulates or proppant particulates 110 are arranged so as to form pore spaces 120 within that matrix and/or pack. FIG. 2 illustrates how the molecules of a substantially monomodal and monodispersed polymeric fluid loss control additive 230 may leave substantial empty space in the pore spaces 220 into which portions of a treatment fluid may leak. FIG. 3 illustrates how a multimodal and/or increased-dispersity polymeric fluid loss control additive (having a first plurality of polymer molecules 330, a second plurality of polymer molecules 340, a third plurality of polymer molecules 350, and a fourth plurality of polymer molecules 360) of the present invention may, inter alia, fill more of the pore spaces of the formation. In certain embodiments of the present invention, smaller polymer molecules 340, 350, and 360 in a multimodal and/or increased-dispersity polymeric fluid loss control additive of the present invention may be able to fill more of the smaller spaces in the pore space 320, thereby preventing the loss of fluid into those spaces more effectively than the monomodal and/or monodispersed polymeric fluid loss control additive depicted in FIG. 2.

The first and second pluralities of polymer molecules used in the present invention may comprise any polymeric material known in the art. The polymers may be naturally-occurring, synthetic, or a combination thereof. Examples of suitable polymers include, but are not limited to, polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), and combinations thereof. In certain embodiments, the gelling agents comprise an organic carboxylated polymer, such as CMHPG. In certain embodiments, the derivatized cellulose is a cellulose grafted with an allyl or a vinyl monomer, such as those disclosed in U.S. Pat. Nos. 4,982,793, 5,067,565, and 5,122,549, the relevant disclosures of which are incorporated herein by reference. Examples of suitable synthetic polymers include, but are not limited to, 2,2'-azobis(2,4-dimethyl valeronitrile), 2,2'-azobis(2,4-dimethyl-4-methoxy valeronitrile), polymers and copolymers of acrylomide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and mixtures and derivatives thereof. In certain embodiments, the polymers may comprise an acrylamide/2-(methacryloyloxy)ethyltrimethylammonium methyl sulfate copolymer. In certain embodiments, the polymers may comprise an acrylamide/2-(methacryloyloxy)ethyltrimethylammonium chloride copolymer. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used.

In certain embodiments, the average molecular weight of the polymer molecules used in the present invention may be above about 10,000 molecular weight units. The first and second pluralities of polymer molecules may comprise polymers having the same molecular formula and structure, or they may be polymers with different molecular formulae and/or structures. A person of skill in the art will recognize when mixtures of different polymers may be desirable to use, for example, when different types of polymers will or will not crosslink with each other, and/or when different types of polymers will exhibit synergistic properties (e.g., enhanced rheological properties) when mixed together. For example, in certain embodiments, it may be desirable to include a mixture of certain polymer molecules that have a greater tendency to crosslink with each other, among other reasons, to enhance the fluid loss control properties of a treatment fluid. In other embodiments, it may be desirable to include a mixture of certain polymer molecules that have a lesser tendency to crosslink with each other, among other reasons, to prevent "over-crosslinking" amongst the polymer molecules and/or over-viscosification of a treatment fluid.

The "combined plurality of polymer molecules" (i.e., at least the first and second pluralities of polymer molecules combined) may be present in a treatment fluid used in the present invention in an amount in the range of from about 0.01% to about 10% by weight of the treatment fluid. In certain embodiments, the "combined plurality of polymer molecules" may be present in a treatment fluid of the present invention in an amount in the range of from about 0.1% to about 4% by weight of the treatment fluid. The individual concentrations of each of the first and second pluralities of polymer molecules may depend upon a variety of factors, including but not limited to, the permeability of the formation and/or proppant pack, the sizes of the pore spaces and/or pore throats therein, the specific types of polymers used, the molecular weight and/or hydrodynamic volume of the polymers, as well as other factors that will be recognized by one skilled in the art. For example, for treatment fluids used in subterranean formations having a permeability above about 1 md, the plurality of polymer molecules having the smaller average molecular weight may be present in a concentration that is about 10% to about 15% of the concentration of the plurality of polymer molecules having the larger average molecular weight. That concentration of polymer molecules having the smaller average molecular weight may be larger for treatment fluids used in subterranean formations having a permeability below about 1 md.

The pluralities of polymer molecules in the treatment fluids and fluid loss additives of the present invention may be provided and/or combined by any means known in the art. Substantially monomodal and/or monodispersed polymeric materials with certain average molecular weights may be combined together, or may be combined with polymeric materials having a different molecular weight distribution (either a distribution occurring naturally, or another altered distribution) in accordance with the methods of the present invention. For example, Halliburton MicroPolymer™ is an example of a commercially-available source of a substantially monomodal plurality of low-molecular weight polymer molecules, which may be combined with another plurality of polymer molecules to create a polymeric fluid loss additive of the present invention.

Figure 5:
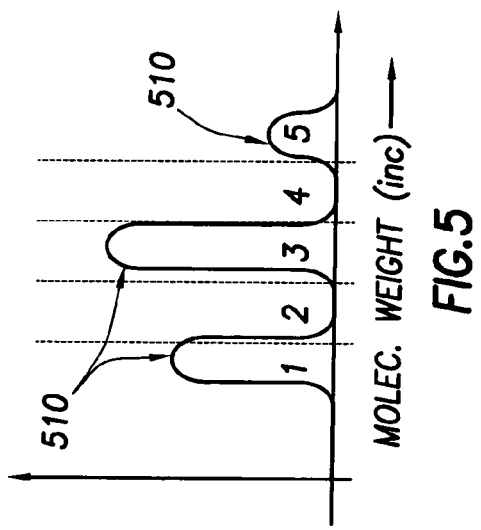
FIG. 5 illustrates some data regarding the dispersity of a polymeric fluid loss control additive of the present invention.
Figure 4:
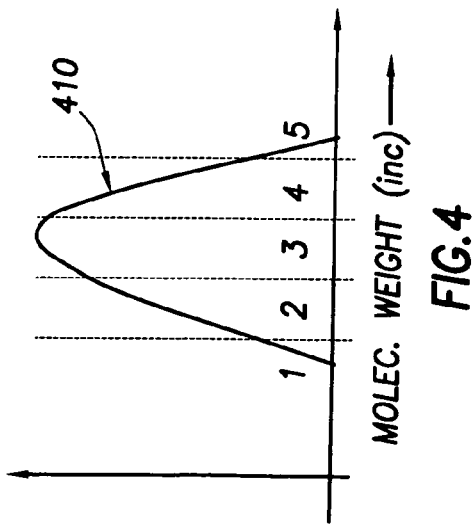
FIG. 4 illustrates some data regarding the dispersity of a polymeric material.

Referring now to FIGS. 4, 5, and 6, lines 410, 510, and 610 therein show the distributions of the pluralities of polymer molecules with molecular weights in given ranges (1-5) for a first polymeric material 410, a multimodal polymeric material 510 (e.g., a polymeric fluid loss additive of the present invention), and an increased-dispersity polymeric material 610 (e.g., another polymeric fluid loss additive of the present invention). The multimodal polymeric material 510 and/or the increased-dispersity polymeric material 610 may be obtained from a process like that described in paragraph [0026] above, wherein a plurality of polymer molecules with a smaller molecular weight has been added to another monomodal polymeric material having a different molecular weight distribution (e.g., the polymeric material illustrated in FIG. 4). The multimodal and increased-dispersity polymeric materials illustrated in FIGS. 5 and 6 may be used as the polymeric fluid loss control additive in certain embodiments of the present invention.

The step of combining the pluralities of polymer molecules (and/or placing those pluralities of polymer molecules in a treatment fluid) in accordance with the present invention may be performed ahead of time (i.e., at a plant or facility) and the mixture may be stored for some period of time prior to use, or the mixing may be performed at the job site. In certain embodiments, the combining may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

In certain embodiments, two or more of the polymer molecules in a treatment fluid or additive of the present invention may be crosslinked together by a crosslinking agent. The term "crosslinking agent" is defined herein to include any molecule, atom, or ion that is capable of forming one or more crosslinks between molecules of the crosslinkable polymer and/or between one or more atoms in a single molecule of the crosslinkable polymer. The crosslinking agent may comprise any crosslinking agent known in the art. Examples of suitable crosslinking agents include, but are not limited to, borate ions, zirconium IV ions, titanium IV ions, aluminum ions, antimony ions, chromium ions, iron ions, copper ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds. In certain embodiments, the crosslinking agent may be present in the treatment fluid of the present invention in an amount sufficient to provide the desired degree of fluid loss control, which may be more or less than the amount that would be included to impart other rheological properties to the treatment fluid or additive. A person of skill in the art will recognize when a crosslinking agent should be included in an additive or a treatment fluid of the present invention, as well as the type and amount of crosslinking agent that should be included.

The treatment fluids of the present invention generally comprise a base fluid and a polymeric fluid loss control additive of the present invention, as described above. The base fluid used in certain embodiments of the present invention may comprise any fluid that does not adversely interact with the other components used in accordance with this invention or with the subterranean formation. For example, the base fluid may be an aqueous-base fluid, a hydrocarbon-based fluid (e.g., kerosene, xylene, toluene, diesel, oils, etc.), a foamed fluid (e.g., a liquid that comprises a gas), or a gas (e.g., nitrogen or carbon dioxide). Aqueous-base fluids may comprise fresh water, salt water, brine, or seawater, or any other aqueous fluid that does not adversely react with the other components used in accordance with this invention (e.g., the consolidating agent) or with the subterranean formation.

In certain embodiments, the treatment fluids of the present invention also may comprise particulate materials, among other purposes, to enhance fluid loss control, form a filter cake, serve as proppant particulates, and/or perform other desired functions. In certain embodiments, proppant particulates may be included in the treatment fluid of the present invention and subsequently deposited in one or more fractures that are created or enhanced in the course of a hydraulic fracturing treatment. The proppant particulates may be comprised of any material suitable for use in subterranean operations. Examples include, but are not limited to, sand, bauxite, ceramic materials, glass materials (e.g., glass beads), polymer materials, Teflon® materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates, and combinations thereof. Composite particulates also may be used, wherein suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, ground nut/seed shells or husks, saw dust, ground cellulose fiber, and combinations thereof. Typically, the particulates have a size in the range of from about 2 to about 400 mesh, U.S. Sieve Series. In particular embodiments, particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof. Moreover, fibrous materials that may be used, inter alia, to bear the pressure of a closed fracture, are often included. In some embodiments, the proppant particulates may be coated with any suitable resin or tackifying agent known to those of ordinary skill in the art.

The treatment fluids used in methods of the present invention optionally may comprise any number of additional additives, including, but not limited to, salts, surfactants, acids, fluid loss control additives, gas, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, and the like. A person skilled in the art, with the benefit of this disclosure, will recognize the types of additives that may be included in the treatment fluids for a particular application.

The treatment fluids and additives of the present invention may be used in any subterranean operation wherein a viscosified fluid may be used. Suitable subterranean operations may include, but are not limited to, drilling operations, hydraulic fracturing treatments, sand control treatments (e.g., gravel packing), acidizing treatments (e.g., matrix acidizing or fracture acidizing), frac-pack treatments, well bore clean-out treatments, and other suitable operations where a treatment fluid of the present invention may be useful.

Therefore, the present invention is well adapted to attain the ends and advantages mentioned as well as those that are inherent therein. While numerous changes may be made by those skilled in the art, such changes are encompassed within the spirit of this invention as defined by the appended claims. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the appended claims have their plain, ordinary meaning unless otherwise explicitly and clearly defined by the patentee.

What is claimed is:

1. A method comprising:
    (a) providing a treatment fluid that comprises
        a base fluid, and
        a polymeric fluid loss control additive that comprises a multimodal polymeric material that comprises at least
            a first plurality of polymer molecules having a first average molecular weight, and
            a second plurality of polymer molecules having a second average molecular weight that is different from the first average molecular weight, wherein the first average molecular weight is smaller than the second average molecular weight, and the first plurality of polymer molecules is present in a concentration that is about 10% to about 15% of the concentration of the second plurality of polymer molecules;
    (b) introducing the treatment fluid into a subterranean formation; and
    (c) allowing at least a portion of the first and second pluralities of polymer molecules to fill at least a portion of the pore spaces in a portion of the subterranean formation.

2. The method of claim 1 wherein the first and second pluralities of polymer molecules comprise polymer molecules having the same molecular formula and molecular structure.

3. The method of claim 1 wherein the first and second pluralities of polymer molecules comprise polymer molecules having different molecular formulas and/or structures.

4. The method of claim 1 wherein the polymeric fluid loss control additive comprises an increased-dispersity polymeric material.

5. The method of claim 1 wherein the first and second pluralities of polymer molecules are each selected from the group consisting of hydroxyethyl guar, hydroxypropyl guar, carboxymethyl guar, carboxymethylhydroxyethyl guar, and carboxymethylhydroxypropyl guar, hydroxyethyl cellulose, carboxyethylcellulose, carboxymethylcellulose, carboxymethylhydroxyethylcellulose, organic carboxylated polymers, derivatized celluloses, 2,2'-azobis(2,4-dimethyl valeronitrile), 2,2'-azobis(2,4-dimethyl-4-methoxy valeronitrile), polymers and copolymers of acrylomide ethyltrimethyl ammonium chloride, acrylamide, acrylamido-and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacry late, partially hydrolyzed polyacrylamide, poly 2-amino-2- methyl propane sulfonic acid, polyvinyl alcohol, sodium 2-acrylamido-2-methylpropane sulfonate, quatemized dimethylaminoethylacrylate, quaternized dimethylaminoethylmethacrylate, acrylamide/2-(methacryloyloxy)ethyltrimethylammonium methyl sulfate copolymers, acrylamide/2-(methacryloyloxy)ethyltrimethylammonium chloride copolymers, and derivatives thereof, and combinations thereof.

6. The method of claim 1 wherein the combined plurality of polymer molecules is present in a combined amount in the range of from about 0.1% to about 4% by weight of the treatment fluid.

7. The method of claim 6 wherein the first and second pluralities of polymer molecules comprise polymer molecules having the same molecular formula.

8. The method of claim 6 wherein the first and second pluralities of polymer molecules comprise polymer molecules having different molecular formulas.

9. The method of claim 1 wherein at least two of the polymer molecules are crosslinked by a crosslinking agent.

10. The method of claim 9 wherein the crosslinking agent is present in an amount sufficient to provide a desired degree of fluid loss control.

11. The method of claim 1 wherein the polymeric fluid loss control additive further comprises a third plurality of polymer molecules having a third average molecular weight wherein the third average molecular weight is different from the first and second average molecular weights.

12. A method of preparing a treatment fluid that comprises:
    providing a base fluid;
    providing a first plurality of polymer molecules having a first average molecular weight;
    providing a second plurality of polymer molecules having a second average molecular weight that is larger than the first average molecular weight; and
    combining the first and second pluralities of polymer molecules with the base fluid such that the first plurality of polymer molecules is present in a concentration that is about 10% to about 15% of the concentration of the second plurality of polymer molecules.

13. The method of claim 12 further comprising introducing the treatment fluid into a subterranean formation.

14. The method of claim 12 further comprising:
    providing a third plurality of polymer molecules having a third average molecular weight that is different from the first and second average molecular weights; and
    combining the third plurality of polymer molecules with the first and second pluralities of polymer molecules and the base fluid.

15. The treatment fluid made by the method of claim 12.

16. A method of preparing a polymeric fluid loss additive that comprises:
- providing a first plurality of polymer molecules having a first average molecular weight;
- providing a second plurality of polymer molecules having a second average molecular weight that is larger than the first average molecular weight; and
- combining the first and second pluralities of polymer molecules to form a multimodal polymeric material such that the first plurality of polymer molecules is present in a concentration that is about 10% to about 15% of the concentration of the second plurality of polymer molecules.

17. The method of claim 16 wherein the polymeric fluid loss control additive comprises an increased-dispersity polymeric material.

18. The method of claim 16 further comprising:
- providing a third plurality of polymer molecules having a third average molecular weight that is different from the first and second average molecular weights; and
- combining the third plurality of polymer molecules with the first and second pluralities of polymer molecules.

19. The polymeric fluid loss additive made by the method of claim 16.

* * * * *

UNITED STATES PATENT AND TRADEMARK OFFICE
CERTIFICATE OF CORRECTION

PATENT NO.        : 7,645,725 B2                                          Page 1 of 1
APPLICATION NO. : 11/404352
DATED             : January 12, 2010
INVENTOR(S)       : Weaver et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this

Sixteenth Day of November, 2010

David J. Kappos
*Director of the United States Patent and Trademark Office*